H. H. SCHNEIDER.
PHONOGRAPHIC RECORDER.
APPLICATION FILED DEC. 12, 1911.
1,050,238.
Patented Jan. 14, 1913.
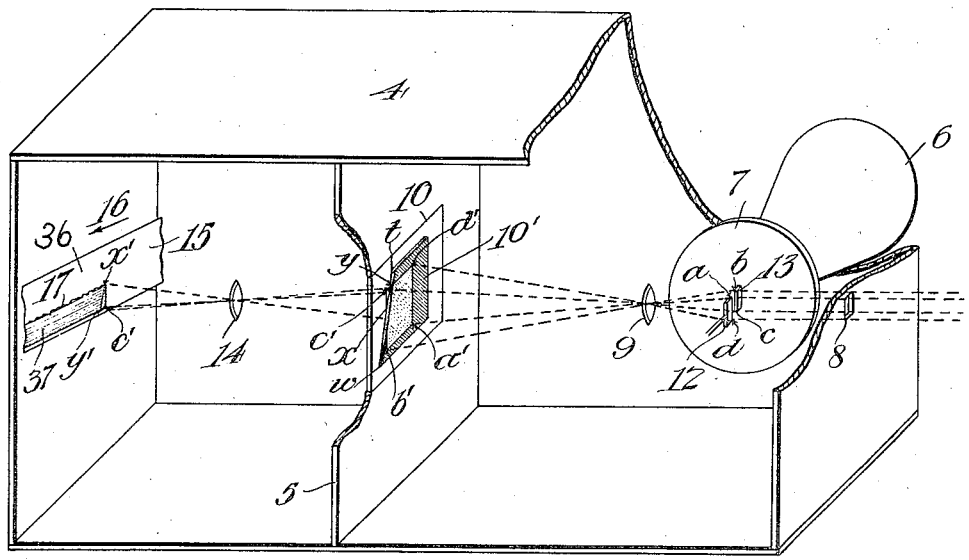

UNITED STATES PATENT OFFICE.

HUGO H. SCHNEIDER, OF SEATTLE, WASHINGTON.

PHONOGRAPHIC RECORDER.

1,050,238.  Specification of Letters Patent.  Patented Jan. 14, 1913.

Application filed December 12, 1911. Serial No. 665,285.

*To all whom it may concern:*

Be it known that I, HUGO H. SCHNEIDER, a citizen of the United States, residing at Seattle, in the county of King and State of Washington, have invented certain new and useful Improvements in Phonographic Recorders, of which the following is a specification.

This invention relates to means for recording sound, and its principal object is to photographically record, in connection with moving pictures, the sounds that are associated with views when photographed.

To this end my invention consists in the construction and combination of parts forming a phonographic recorder, hereinafter more fully described and particularly stated in the claims, reference being had to the accompanying drawing, which is a perspective view of the principal features of a phonographic recorder according to my invention, part of the boxing being broken away.

Let numeral 4 represent a camera box, divided into two chambers by the partition 5; 6, a sound receiver, and 7 a diaphragm to be vibrated by the sound waves.

Through an aperture 8 and the lens 9 rays of light are directed upon a ground glass or other partially transparent screen 10, located in the partition 5. A screen 12 may be fixed at one side of the path of light to intercept diverging rays and outline this side of the light image definitely. Another screen 13 is connected with the diaphragm 7 to be vibrated therewith by sound waves. These screens 12 and 13 limit the opening $a, b, c, d$, and define the side lines $a' b' c' d'$ of the light image on the ground glass 10. An opaque screen 10' with a slanting edge $t, w$, is permanently fixed either in front or behind the ground glass 10 to prevent the light image from showing in full strength on the ground glass excepting at the little triangle $c' x, y$, which projects over the edge of screen 10'. This light image, as seen on the rear side of the ground glass, is projected by an object lens 14 upon a sensitized film 15, which may be mounted to travel in a path at right angles to either the edge $x', y'$ or $x', c'$, of the light image, in the general direction indicated by the arrow 16.

Actinic rays passing through the triangle $c', x, y$, produce a continuous photograph 37 on the film 15, and as the film travels along, the horizontal vibrations of the edge of light at $b', c'$ crossing the slanting edge $t, w$ cause the point of the light $x$ to move up and down, thus giving the photograph an undulating edge 17. The vibrations of the diaphragm 7 and the screen 13, in response to the infinite modulations of sound are often very minute, and, in order to render the transcript accurately readable, I magnify the record of those vibrations by making the angle of light $c', x, y$ acute. The more acute the angle is the greater will be the vertical movement of the point $x$, for any given horizontal movement of the vibrating edge $b' c'$ of light.

The photograph of areas 37 and 36 in different degrees of light and shade, with their undulating line of juncture 17, constitutes the record sought. The photographed film may be developed and finished by usual means. The ground glass 10 is introduced to aid in illustration. It may not be needed in practice.

By various well known expedients the light may be so controlled as to produce that degree of contrast in the light and shade of the two surfaces 36 and 37 which experience may dictate.

Means for reproducing sound from records herein described are the subject of a contemporary invention.

I claim:

1. In a phonographic recorder, means for causing longitudinal movement of a photographically sensitive film; a diaphragm mounted to be vibrated by sound waves; a screen connected with the diaphragm to vibrate therewith and arranged to intercept rays of light in a line crossing the film; and another screen fixed to intercept the rays in a line crossing the aforesaid line at an angle, whereby a lighted surface and a shaded surface, parted at a line of undulating curves, are formed, photographically picturing a record of the sound-impelled vibrations of the said diaphragm.

2. A phonographic recorder comprising means for causing longitudinal movement of a photographically sensitive film; means for directing rays of light upon the film; two screens hung to intercept portions of the rays, the shadows of these screens forming an acute angle, and means for vibrating one of the screens by the action of sound waves.

3. Means for causing longitudinal movement of a photographically sensitive film; means for directing rays of light upon the film; two screens arranged to intercept some of those rays and cast shadows which converge at an acute angle; and means for vibrating one of the screens by the action of sound waves.

In testimony whereof I affix my signature in presence of two witnesses.

HUGO H. SCHNEIDER.

Witnesses:
C. P. TATRO,
GEO. T. CARDER.